(12) United States Patent
Dickie et al.

(10) Patent No.: US 10,613,506 B2
(45) Date of Patent: Apr. 7, 2020

(54) APPARATUS AND METHOD FOR CREATING AND PRESENTING CONTROL LOGIC

(75) Inventors: Kenneth Pierson Dickie, Edmonton (CA); Bernardo Anger, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 800 days.

(21) Appl. No.: 14/376,958

(22) PCT Filed: Jun. 29, 2012

(86) PCT No.: PCT/US2012/044767
§ 371 (c)(1),
(2), (4) Date: Jan. 23, 2015

(87) PCT Pub. No.: WO2013/103382
PCT Pub. Date: Jul. 11, 2013

(65) Prior Publication Data
US 2015/0160642 A1    Jun. 11, 2015

Related U.S. Application Data

(60) Provisional application No. 61/583,956, filed on Jan. 6, 2012.

(51) Int. Cl.
*G05B 19/05* (2006.01)
*G05B 19/042* (2006.01)
(Continued)

(52) U.S. Cl.
CPC ....... *G05B 19/056* (2013.01); *G05B 19/0426* (2013.01); *G05B 19/054* (2013.01);
(Continued)

(58) Field of Classification Search
CPC .............. G05B 19/056; G05B 19/0426; G05B 23/0243; G05B 19/054; G05B 2219/1204; G06Q 30/016
See application file for complete search history.

(56) References Cited

U.S. PATENT DOCUMENTS 5,530,643 A    6/1996  Hodorowski
5,870,537 A    2/1999  Kern et al.
(Continued)

FOREIGN PATENT DOCUMENTS

CN    1857877 A    11/2006
CN    1862477 A    11/2006
(Continued)

OTHER PUBLICATIONS

Soon et al., Test Strategy and Automation for Complex Systems, dated Mar. 1, 2007, IP.com Prior Art Database Technical Disclosure, IP.com No. IPCOM000147528D, Mar. 1, 2007.
(Continued)

*Primary Examiner* — Charles E Anya
(74) *Attorney, Agent, or Firm* — Armstrong Teasdale LLP

(57) ABSTRACT

A platform at a communication network is provided for the procurement of control logic. Customer order parameters are obtained via the communication network. The customer order parameters include at least one of: interface connections for the automation controller, interface configurations for the automation controller, and operating characteristics of the automation controller. Control logic is built that conforms to the custom order parameters. The control logic is stored on the communication network. Changes to the control logic are received and the control logic is changed without the involvement of a third party monitor.

17 Claims, 17 Drawing Sheets

(51) Int. Cl.
*G05B 23/02* (2006.01)
*G06Q 30/00* (2012.01)

(52) U.S. Cl.
CPC ....... *G05B 23/0243* (2013.01); *G06Q 30/016* (2013.01); *G05B 2219/1204* (2013.01)

(56) References Cited

U.S. PATENT DOCUMENTS

| | | | |
|---|---|---|---|
| 6,353,926 | B1 | 3/2002 | Parthesarathy et al. |
| 6,445,963 | B1 | 9/2002 | Blevins et al. |
| 6,449,624 | B1 | 9/2002 | Hammack et al. |
| 6,567,937 | B1 | 5/2003 | Flores et al. |
| 6,704,735 | B1 | 3/2004 | Salo et al. |
| 6,799,080 | B1 | 9/2004 | Hylden et al. |
| 6,882,890 | B2 | 4/2005 | Horn et al. |
| 6,904,449 | B1 | 6/2005 | Quinones |
| 7,103,647 | B2 | 9/2006 | Aziz |
| 7,127,330 | B2 | 10/2006 | Spool et al. |
| 7,143,186 | B2 | 11/2006 | Stewart et al. |
| 7,246,078 | B2 | 7/2007 | Vincent |
| 7,257,620 | B2 | 8/2007 | Lo |
| 7,290,244 | B2 | 10/2007 | Peck et al. |
| 7,318,044 | B2 | 1/2008 | Matsuoka et al. |
| 7,330,473 | B1 | 2/2008 | Baier et al. |
| 7,392,421 | B1 | 6/2008 | Bloomstein et al. |
| 7,401,059 | B1 | 7/2008 | Owen et al. |
| 7,523,045 | B1 | 4/2009 | Walker et al. |
| 7,634,757 | B2 | 12/2009 | de Groot et al. |
| 7,738,975 | B2 | 6/2010 | Denison et al. |
| 7,747,404 | B2 | 6/2010 | Meckelburg et al. |
| 7,778,883 | B2 | 8/2010 | Albazz et al. |
| 7,860,609 | B2 | 12/2010 | Yanagita et al. |
| 7,861,223 | B1 | 12/2010 | Schmidt et al. |
| 7,870,223 | B2 | 1/2011 | Grgic et al. |
| 7,908,194 | B2 | 3/2011 | Hollas |
| 7,912,560 | B2 | 3/2011 | Hood et al. |
| 7,958,013 | B2 | 6/2011 | Porat et al. |
| 7,970,830 | B2 | 6/2011 | Staggs et al. |
| 8,015,373 | B2 | 9/2011 | Ballard et al. |
| 8,015,546 | B2 | 9/2011 | Jones et al. |
| 8,024,732 | B2 | 9/2011 | Sheehan et al. |
| 8,121,707 | B2 | 2/2012 | Karaffa et al. |
| 8,468,335 | B2 | 6/2013 | Lin et al. |
| 8,584,114 | B2 | 11/2013 | Rabinovich et al. |
| 2002/0004709 | A1 | 1/2002 | Peter et al. |
| 2002/0029377 | A1 | 3/2002 | Pavela et al. |
| 2002/0049625 | A1 | 4/2002 | Kilambi et al. |
| 2003/0018681 | A1* | 1/2003 | Subramanian ........ G06F 9/3861 718/102 |
| 2003/0036876 | A1 | 2/2003 | Fuller et al. |
| 2003/0063013 | A1 | 4/2003 | Jin et al. |
| 2003/0076353 | A1 | 4/2003 | Blackstock et al. |
| 2003/0163212 | A1 | 8/2003 | Smith et al. |
| 2003/0204784 | A1 | 10/2003 | Jorapur |
| 2003/0216986 | A1 | 11/2003 | Hassan |
| 2005/0011967 | A1 | 1/2005 | Skelton-Becker et al. |
| 2005/0132055 | A1 | 6/2005 | Neogi |
| 2005/0132064 | A1 | 6/2005 | Lo |
| 2005/0138111 | A1 | 6/2005 | Aton et al. |
| 2005/0278577 | A1 | 12/2005 | Doong et al. |
| 2006/0036876 | A1 | 2/2006 | Kitada |
| 2006/0036907 | A1 | 2/2006 | Inscoe et al. |
| 2006/0064183 | A1 | 3/2006 | Chandhoke |
| 2006/0089886 | A1 | 4/2006 | Wong |
| 2006/0095855 | A1 | 5/2006 | Britt et al. |
| 2006/0235594 | A1 | 10/2006 | Knoefler et al. |
| 2006/0245564 | A1 | 11/2006 | Li et al. |
| 2007/0005266 | A1 | 1/2007 | Blevins et al. |
| 2007/0074280 | A1 | 3/2007 | Callaghan et al. |
| 2007/0094541 | A1 | 4/2007 | Kang |
| 2007/0118345 | A1 | 5/2007 | Olesen et al. |
| 2007/0208435 | A1* | 9/2007 | Schott ................ G05B 19/056 700/17 |
| 2008/0033360 | A1* | 2/2008 | Evans ................ A61M 5/172 604/151 |
| 2008/0141238 | A1 | 6/2008 | Balassanian |
| 2008/0154909 | A1 | 6/2008 | Dam et al. |
| 2008/0208380 | A1* | 8/2008 | Taylor ................ G05B 19/0426 700/108 |
| 2008/0222604 | A1 | 9/2008 | Murphy |
| 2008/0243311 | A1 | 10/2008 | Dahmer et al. |
| 2008/0244449 | A1 | 10/2008 | Morrison et al. |
| 2008/0250045 | A1 | 10/2008 | Balassanian et al. |
| 2009/0012631 | A1 | 1/2009 | Fuller |
| 2009/0037008 | A1 | 2/2009 | Moorer et al. |
| 2009/0063650 | A1 | 3/2009 | Anslow et al. |
| 2009/0144108 | A1 | 6/2009 | Cloud |
| 2009/0204458 | A1 | 8/2009 | Wiese et al. |
| 2009/0217163 | A1 | 8/2009 | Jaroker |
| 2009/0265694 | A1 | 10/2009 | Bakowski |
| 2009/0300149 | A1 | 12/2009 | Ferris et al. |
| 2009/0300423 | A1 | 12/2009 | Ferris |
| 2009/0327967 | A1* | 12/2009 | Matsuda ............. G05B 19/056 715/840 |
| 2010/0023600 | A1 | 1/2010 | Hill et al. |
| 2010/0023918 | A1 | 1/2010 | Bernardini et al. |
| 2010/0082844 | A1 | 4/2010 | Stoupis et al. |
| 2010/0088150 | A1 | 4/2010 | Mazhar et al. |
| 2010/0131624 | A1 | 5/2010 | Ferris |
| 2010/0138017 | A1 | 6/2010 | Vrba et al. |
| 2010/0223157 | A1 | 9/2010 | Kaisi |
| 2010/0278336 | A1 | 11/2010 | Tahan et al. |
| 2010/0306379 | A1 | 12/2010 | Ferris |
| 2010/0318665 | A1 | 12/2010 | Demmer et al. |
| 2011/0022626 | A1 | 1/2011 | Plache et al. |
| 2011/0022827 | A1 | 1/2011 | Plache et al. |
| 2011/0117845 | A1 | 5/2011 | Kirsch et al. |
| 2011/0126168 | A1 | 5/2011 | Ilyayev |
| 2011/0145439 | A1 | 6/2011 | Chaturvedi et al. |
| 2011/0154092 | A1 | 6/2011 | Dash et al. |
| 2011/0154451 | A1 | 6/2011 | Thomas |
| 2011/0179154 | A1 | 7/2011 | Ravichandran et al. |
| 2011/0191181 | A1 | 8/2011 | Blackhurst et al. |
| 2011/0191500 | A1 | 8/2011 | Odayappan et al. |
| 2011/0191822 | A1* | 8/2011 | Pinsky ................... G06F 15/16 726/3 |
| 2011/0197097 | A1 | 8/2011 | Beaty et al. |
| 2011/0202901 | A1 | 8/2011 | Givoni et al. |
| 2011/0208606 | A1 | 8/2011 | Hadar et al. |
| 2011/0208695 | A1 | 8/2011 | Anand et al. |
| 2011/0231670 | A1 | 9/2011 | Shevchenko et al. |
| 2011/0231818 | A1 | 9/2011 | Steden |
| 2011/0238458 | A1 | 9/2011 | Purcell et al. |
| 2011/0246721 | A1 | 10/2011 | Crisan |
| 2011/0264044 | A1* | 10/2011 | Bartz ................ A61M 5/14212 604/151 |
| 2011/0264550 | A1 | 10/2011 | Fair |
| 2011/0271278 | A1 | 11/2011 | Dittrich |
| 2011/0282476 | A1 | 11/2011 | Hegemier et al. |
| 2011/0282940 | A1 | 11/2011 | Zhang et al. |
| 2011/0314168 | A1 | 12/2011 | Bathiche et al. |
| 2012/0010488 | A1 | 1/2012 | Henry et al. |
| 2012/0109384 | A1 | 5/2012 | Stepanian |
| 2012/0131176 | A1 | 5/2012 | Ferris et al. |
| 2012/0143767 | A1 | 6/2012 | Abadir |
| 2012/0158972 | A1 | 6/2012 | Gammill et al. |
| 2012/0185821 | A1 | 7/2012 | Yaseen et al. |
| 2013/0024542 | A1 | 1/2013 | Keller et al. |
| 2013/0024572 | A1 | 1/2013 | Chen |
| 2013/0036210 | A1* | 2/2013 | Birtwhistle ............ G16H 40/40 709/221 |
| 2013/0096727 | A1 | 4/2013 | Brandt et al. |
| 2013/0124465 | A1 | 5/2013 | Pingel et al. |
| 2013/0211546 | A1 | 8/2013 | Lawson et al. |
| 2013/0211555 | A1 | 8/2013 | Lawson et al. |
| 2013/0211559 | A1 | 8/2013 | Lawson et al. |
| 2013/0212129 | A1 | 8/2013 | Lawson et al. |
| 2013/0212420 | A1 | 8/2013 | Lawson et al. |
| 2013/0282180 | A1 | 10/2013 | Layton et al. |
| 2014/0047064 | A1 | 2/2014 | Maturana et al. |
| 2014/0047107 | A1 | 2/2014 | Maturana et al. |

(56) References Cited

U.S. PATENT DOCUMENTS

2014/0058535 A1  2/2014  Dickie
2015/0066979 A1  3/2015  Zhang et al.

FOREIGN PATENT DOCUMENTS

| | | |
|---|---|---|
| CN | 101083657 A | 12/2007 |
| CN | 101196740 A | 6/2008 |
| CN | 101208674 A | 6/2008 |
| CN | 101782893 A | 7/2010 |
| CN | 101958805 A | 1/2011 |
| CN | 102105861 A | 6/2011 |
| EP | 1296232 A2 | 3/2003 |
| EP | 1742125 A2 | 1/2007 |
| EP | 1814036 A2 | 8/2007 |
| EP | 2040135 A2 | 3/2009 |
| EP | 2237120 A2 | 10/2010 |
| EP | 2592812 A2 | 5/2013 |
| WO | 200075826 A1 | 12/2000 |
| WO | 0228125 A2 | 4/2002 |

OTHER PUBLICATIONS

IBM, "Method of Creating a Componentized Architecture for Unifying Resource Sharing Scenarios in Cloud Computing Environment", Prior Art Database Disclosure, pp. 1-13, Feb. 11, 2010.

Zexi et al., "An Optimal Hysteretic Control Policy for Energy Saving in Cloud Computing", Global Telecommunications Conference, pp. 1-5, 2011.

International Search Report and Written Opinion issued in connection with related Application No. PCT/US2013/048529 dated Oct. 4, 2013.

Unofficial English Translation of Chinese Office Action issued in connection with related CN Application No. 201280071226.X dated Nov. 24, 2015.

Unofficial English Translation of Chinese Office Action issued in connection with related CN Application No. 201280071182.0 dated Dec. 31, 2015.

Kenneth Pierson Dickie, filed Nov. 24, 2014, U.S. Appl. No. 14/376,535.

Kenneth Pierson Dickie, filed Dec. 3, 2014, U.S. Appl. No. 14/376,539.

Kenneth Pierson Dickie, filed Aug. 6, 2014, U.S. Appl. No. 14/376,881.

Cunning et al., "Automatic Test Case Generation from Requirements Specifications for Real-time Embedded Systems", vol. No. 5, pp. 784-789, 1999.

Husain et al., "Remote device management of WiMAX devices in multi-mode multi-access environment", pp. 1-13, Mar. 31-Apr. 2, 2008.

"Knowledge as a Service (KaaS) Enables the Right Action, Right Now", Cumulus IQ: Knowledge as a Service, 2009.

Altmann et al., "A Marketplace and its Market Mechanism for Trading Commoditized Computing Resources", TEMEP Discussion Papers, Mar. 2010.

Ranchal et al., "Protection of Identity Information in Cloud Computing without Trusted Third Party", 29th IEEE International Symposium on Reliable Distributed Systems, pp. 368-372, 2010.

"Top ten advantages of Google's cloud", Google Apps for Business, 2011.

Xianjin et al., "File Synchronization of Multi-Machine System Design and Implementation Based Cloud Storage", pp. 1275-1278, 2011.

Salves, "Timeline Cloud Family Edition Reviewed", Pudai LLC, Jul. 18, 2011.

Arefin et al., "CloudInsight: Shedding Light on the Cloud", 30th IEEE International Symposium on Reliable Distributed Systems, pp. 219-228, Oct. 4-7, 2011.

International Search Report and Written Opinion issued in connection with corresponding PCT Application No. PCT/US2012/044767 dated Sep. 19, 2012.

International Search Report and Written Opinion issued in connection with corresponding PCT Application No. PCT/US2012/044770 dated Sep. 19, 2012.

International Search Report and Written Opinion issued in connection with corresponding PCT Application No. PCT/US2012/044759 dated Sep. 19, 2012.

International Search Report and Written Opinion issued in connection with corresponding PCT Application No. PCT/US2012/044766 dated Oct. 17, 2012.

PCT International Preliminary Report on Patentability issued in connection with related PCT Application No. PCT/US2013/048529 dated Mar. 5, 2015.

* cited by examiner

APPARATUS AND METHOD FOR CREATING AND PRESENTING CONTROL LOGIC

CROSS REFERENCES TO RELATED APPLICATIONS

This application claims priority to U.S. Provisional Application Ser. No. 61/583,956, filed on Jan. 6, 2012, the contents of which are incorporated herein by reference in its entirety.

PCT International application entitled "Method and Apparatus for Network Based Testing" naming as inventor Kenneth Dickie and having Ser. No. 14/376,958;

PCT International application entitled "Apparatus and Method for Synchronization of Control Logic" naming as inventor Kenneth Dickie and having Ser. No. 14/376,958; and PCT International application entitled "Apparatus and Method for Third Party Creation of Control Logic" naming as inventor Kenneth Dickie and having Ser. No. 14/376,958;

are being filed on the same date as the present application, the contents of which are incorporated herein by reference in their entireties.

BACKGROUND OF THE INVENTION

Field of the Invention

The subject matter disclosed herein relates to the provision of control logic for automation controllers.

Brief Description of the Related Art

Automated devices perform various functions and these devices typically include a controller or control device that controls or manages the execution of these functions. For example, robotic controllers (e.g., those that utilize microprocessors) often control the functions of a robot and the robot can perform various manufacturing tasks. Assembly line controllers are used to control the various functions performed on or at an assembly line. A consumer device controller may be used to control the operation and functioning of any type of consumer device (e.g., a washer, dryer, dishwasher, building security system, building lighting system, building heating system, conveyer, boiler, extruder, pump, valve, control arm, or microwave oven). Together, these types of controllers provide automated functions and are generally referred to as automation controllers.

An automation controller typically includes and utilizes control logic to perform its functions. Control logic may include computer software and/or computer hardware that performs various predetermined functions. For example, an assembly line controller (e.g., for a bottling plant) may include a microprocessor that operates programmed computer software to regulate the speed and other functions associated with operating an assembly line that fills and caps the bottles. In another example, a controller may also include a microprocessor running programmed computer software that regulates various device parameters (e.g., temperature, pressure, or operating speed). In yet another example, a water system controller may include control logic that controls pumps and sprinklers.

Conventionally, the provision of control logic for automation controllers typically requires a customer to approach a third party provider to obtain the control logic. Further, the third party provider builds the logic to the customer's specifications and travels to the customer's site to manually install it on the customer's automation controller. Unfortunately, these approaches are expensive, cumbersome, mistake-prone, and time-consuming to implement, maintain, and fix and these disadvantages frustrate customers that utilize control logic.

BRIEF DESCRIPTION OF THE INVENTION

In one aspect, a platform is provided at a communication network for the procurement of control logic. Customer order parameters are obtained via the communication network. The customer order parameters may include one or more interface connections for the automation controller, interface configurations of the automation controller, and operating characteristics of the automation controller. The control logic is built that conforms to the customer order parameters. The control logic is stored on the communication network and may be downloaded to the automation controller. Changes to the control logic are received at the communication network and the control logic is changed without the involvement of a third party vendor.

In other aspects, the customer order may be received via a graphical user interface. In one example, the customer order is entered via manipulation of the graphical display. The customer order describes a plurality of control elements and interaction of selected ones of the plurality of control elements with each other.

In still other aspects, the controller may be a wide variety of controller types. For example, the controller may be a robot controller, an assembly line controller, or a consumer device controller. In yet other aspects, the automation controller may be an emulated controller or a physical controller. In still other aspects, the controller may be any type of industrial controller utilizing a programmable logic controller.

The control logic may be any combination of hardware and/or software. In one example, the control logic may utilize software routines stored in a software library or central repository.

In other aspects, an apparatus for building and changing control logic and resides at a communication network includes an interface and a processor. The interface has an input and output. The input receives customer order parameters via a network based website.

The processor is coupled to the memory and the interface. The processor is configured to build control logic that conforms to the customer order parameters and to store the control logic at the central repository. The processor is further configured to receive changes to the control logic at the input of the interface and to change the control logic without the involvement of a third party vendor. The customer order parameters may include at least one of: interface connections of the automation controller, interface configurations of the automation controller, and operating characteristics of the automation controller.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Approaches are provided for the provision and alteration of control logic used with automation controllers. The approaches are implemented at a communication network such as the Internet. Customer orders may be accepted by a platform (e.g., a website) at the communication network and the control logic is created at the communication network. Once created, the control logic can be automatically or manually downloaded to the automation controller. In so doing, a third party vendor does not have to physically travel to the customer site to integrate the control logic. Changes to the control logic can also be easily made at the communication network and automatically downloaded to the automation controller obtaining similar advantages. Utilizing the approaches described herein, one technical affect is that a customer need only access a single web site (or other access mechanism) to obtain and/or change control logic for their automation controller. The approaches described herein are easy to use, cost effective, and provide a user-friendly customer interface for the provision of control logic and/or the display of automation controller related information.

Figure 1:
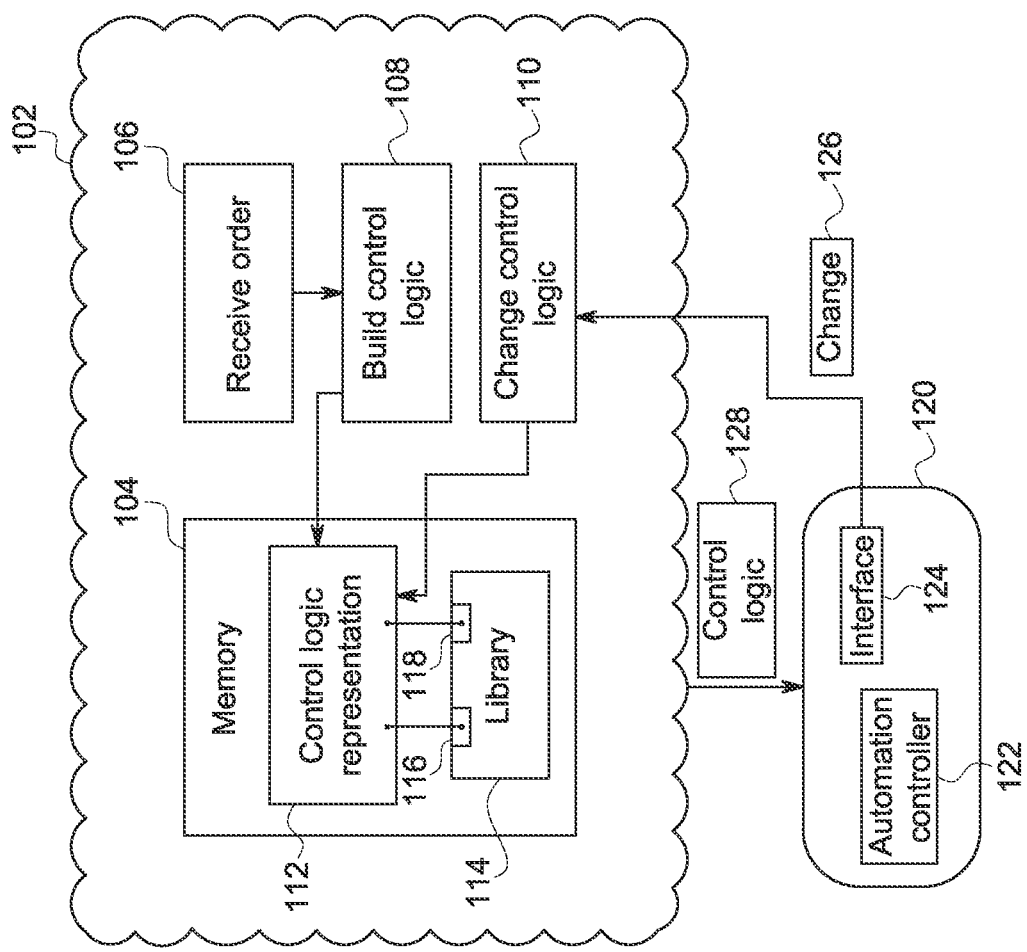
FIG. 1 comprises a block diagram of a communication network that facilitates the provision of control logic according to various embodiments of the present invention.

Referring now to FIG. 1, a system for the creation and presentation of control logic is described. The system includes a communication network 102. The communication network 102 is coupled to a customer site 120. The customer site 120 includes an automation controller 122 and an interface 124. The customer site 120 may be any factory, office, home, power plant, device, communication facility (e.g., a base station) or any other location that may advantageously use an automation controller.

The communication network 102 may be any type of communication network such as the Internet, a computer network, a cellular telephone network, or any combination of these or other networks. In this respect, the communication network 102 may include any number of devices such as computers, access points, routers, and servers, to mention a few examples.

In one aspect, the communication network 102 includes a memory 104, a receive order module 106, a build control logic module 108, and a change control logic module 110. The memory 104 (which can be any type of memory device or combination of memory devices) includes a control logic representation 112 and a library or central repository 114 with modules 116 and 118. The memory 104 as well as the other elements of the communication network 102 may physically reside on any type of device or devices such as servers, access points, computers, or routers. As mentioned, the central repository 114 includes modules 116 and 118. Alternatively, a third party can create the entire control logic 112 (without the modules 116 and 118). In other aspects, a third party can create pieces of different types of logic (e.g., the same type of control logic for different automation controllers or different types of control logic for the same automation controller).

The control logic representation 112 is a description (in one example, implemented as programmed software or code) that represents the control logic at the automation controller 122. More specifically, the control logic representation 112 describes the functions, workings, operation, inputs, outputs, and other characteristics of the operation of the associated control logic of the automation controller 122. In other aspects, the control logic representation 112 may be hardware, software, or combinations of hardware and software elements. In one aspect, the control logic representation 112 is the same as the control logic at the automation controller. Consequently, one technical affect is that changes can be made to the control logic representation 112 (without halting the operation of the automation controller 122) and these can be later downloaded to the automation controller 122.

The control logic representation 112 utilizes modules 116 and 118 from the central repository 114. In this respect, the modules 116 and 118 may be programmed software modules that perform specified functions. Although only two modules 116 and 118 are shown, it will be appreciated that any number of modules may be used. Further, it will be understood that different control logic representations may utilize (share) the same module or modules.

Automation controller 122 may be any device, combination of devices, or network of devices that are implemented in any combination of hardware or software. In one example, the automation controller 122 is an assembly line controller. In other examples, the automation controller is a controller for a pumping network (e.g., pumps, valves, pipes, sprinklers, and their associated controllers). Other examples of automation controllers and systems that utilize automation controllers are possible.

The interface 124 is any type of interface device that interacts with a human such as a personal computer, a laptop, a cellular telephone, or a personal digital assistant. Other examples of interfaces are possible.

The receive order module 106 receives a customer order. In this respect, it includes the hardware and/or software interfaces required to receive and interpret such an order. The build control logic module 108 builds the control logic using at least in part central repository routines 116 and 118 in the central repository 114. In this respect, the build control logic module 108 includes hardware and/or software routines that construct control logic.

The change control logic module 110 changes the control logic. Once changed, the new version can be stored in the memory 104 and eventually sent to the automation controller 122. Multiple versions of the control logic may be stored and some automation controls may use first versions while other automation controllers may use second versions. More specifically, the change control logic module 110 receives change requests from a customer, interprets these requests, and issues instructions/commands that change the control logic representation 112. Then, the control logic representation 112 can be downloaded to the automation controller 122.

In one example of the operation of the system of FIG. 1, customer order parameters are obtained from a customer via the communication network 102 and are received by the receive order module 106. The customer order parameters, in one example, include one or more of interface connections for the automation controller, interface configurations of the automation controller, or operating characteristics of the automation controller. Control logic 128 is created that conforms to the customer order parameters and this control logic is sent to the automation controller 122. The transmission of the control logic to the automation controller may be immediately or, alternatively, when convenient to the customer (e.g., when the controller 122 is idle). The representation of the control logic 112 is stored in the memory 104.

Changes 126 to the control logic 128 are received and the control logic representation 112 is changed by the change control logic module 110 without the involvement of a third party vendor. Advantageously, the third party vendor does not need to travel to a customer site to install the control logic thereby saving time and expenses for the customer.

Figure 2:
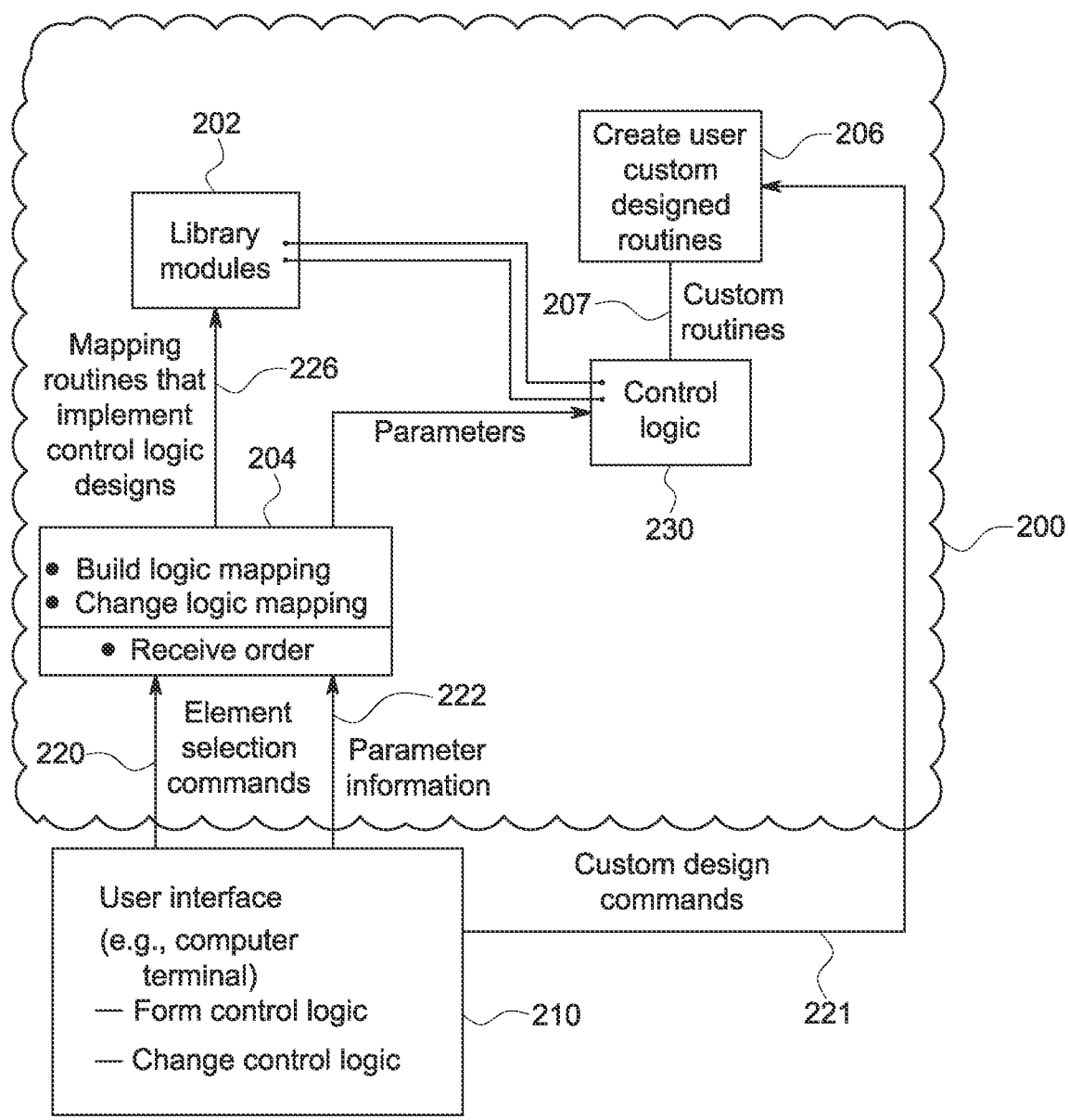
FIG. 2 comprises a flow chart showing an approach for the provision of control logic according to various embodiments of the present invention.

Referring now to FIG. 2 one example of an approach that builds and potentially changes control logic is described. A communication network 200 includes a central repository 202 (that includes central repository software modules) and a user custom designed routine module 206 (that builds user custom designed routines). Additionally, parameters associated with the central repository modules are also stored. A module 204 receives customer orders, and issues instructions that build and change control logic.

A user interface 210 receives orders (or control logic change requests) from customers. These orders may be entered at the user interface 210. For instance, the user may use a GUI to select particular icons (e.g., a pump) on a computer screen or may enter parameters related to a particular and already selected element (e.g., the pressure or other operating characteristics of the pump). Selection of an element (e.g., a pump icon) causes element selection commands 220 to be sent to the module 204. Selection or the entering of parameters causes parameter information 222 to be sent to the module 204. Alternatively, a user may custom design their own routines and custom design commands 221 indicating these routines may be sent to module 206.

The module 204 maps the commands 220 to particular software routines in the central repository 202 via a mapping 226. As the user's selections are mapped to various software routines in the central repository 202, control logic 230 is formed and the information 222 (indicating parameters) is associated with this control logic 230. The module 206 creates any user custom designed routines 207 and these routines 207 may also be included as part of the control logic 230 (or comprise the entire control logic 230 in other examples). The user custom designed routines 207 may utilize one or more central repository modules as well. The control logic 230 formed can then be downloaded to an automation controller. It will be appreciated that the commands and information described with respect to FIG. 2 may be implemented as any appropriate type of computer command or data structure in any suitable computer language and the selection of the particular implementation structure may vary according to the needs of the user and the system.

Figure 3:
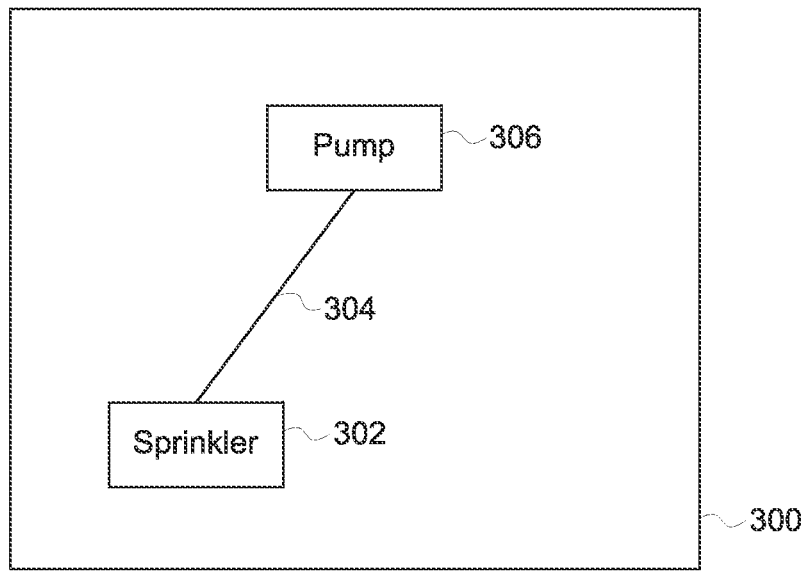
FIG. 3 comprises one example of a graphical user interface (GUI) according to various embodiments of the present invention.

Referring now to FIG. 3, one example of a graphical user interface (GUI) display with one or more automation controllers chosen by a user is described. In this example, the GUI display 300 illustrates that a user has selected a sprinkler 302, a pump 306, and a connector line 304. An automation controller may be associated with each of these elements or a single automation controller may control all of these elements. It will be appreciated that any suitable GUI tool (e.g., a computer screen with a computer mouse) can be used to select these elements. A user can also connect the elements together and enter operating parameters for these elements. In one aspect, these user selections are mapped to actual central repository routines to create control logic as described above with respect to FIG. 2. Once the control logic is created at the communication network, it can be downloaded automatically or manually to the automation controller or controllers at appropriate or convenient times.

Figure 4:
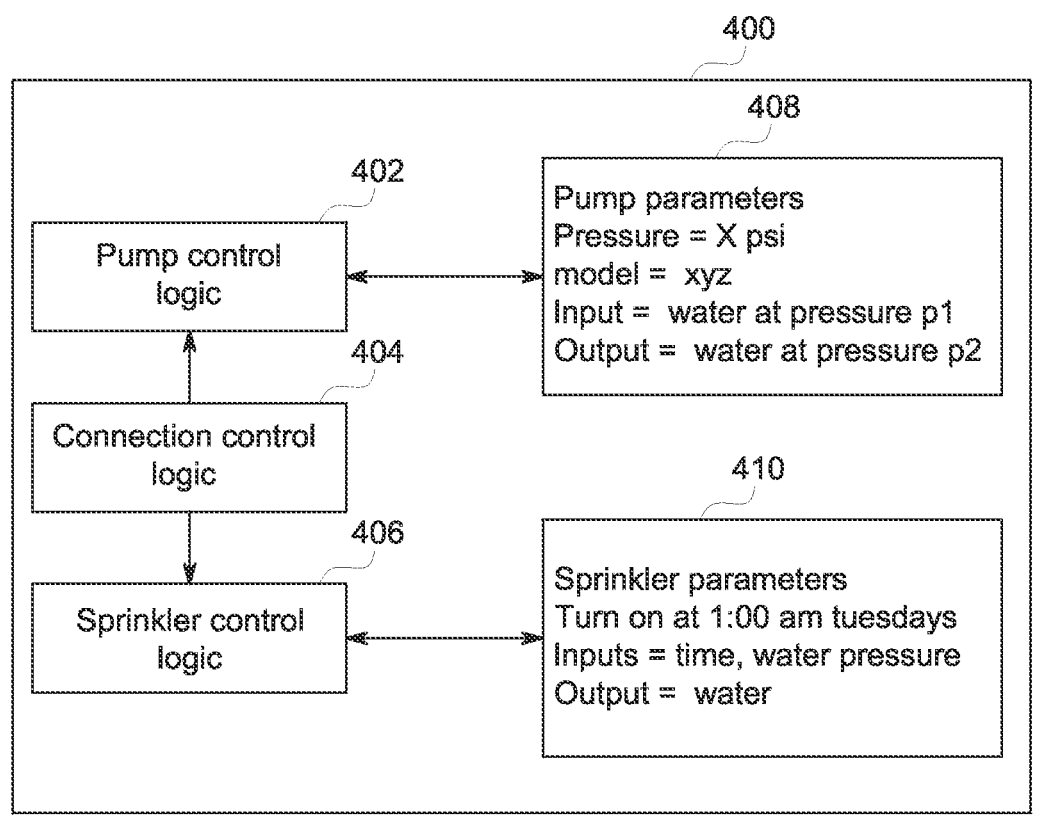
FIG. 4 comprises a block diagram of the control logic built according to user instructions entered via the GUI of FIG. 3 according to various embodiments of the present invention.

Referring now to FIG. 4, one example of control logic 400 created by a user entering the information shown in FIG. 3 is described. It will be appreciated that the elements shown in FIG. 4 can be implemented in any combination of hardware and/or software (and routines in a software library or central repository).

It will be further understood that separate portions of the control logic 400 may operate individual automation controllers (e.g., in the case where a separate physical controller operates each of the pump, sprinkler, and connection between sprinkler and pump). In another example, the control logic 400 is disposed on a single automation controller (that operates the pump, sprinkler, and connections). Further, the automation controllers may be emulated controllers or physical controllers.

Control logic 400 includes pump control logic 402, connection logic 404, and sprinkler logic 406. The pump control logic 402 describes the functioning and operation of the pump and utilizes pump parameters 408. The pump parameters 408 may include pressure information, model information (of the pump), input information, and output information. Other examples of pump parameters are possible.

Connection control logic 404 describes the physical connection between the pump and the sprinkler. For example, the connection control logic may include the size and length of the pipe connecting the pump and the sprinkler.

The sprinkler control logic 406 describes the operation of the sprinkler. This control logic uses sprinkler parameters 410. In one example, the sprinkler parameters 410 are used by the sprinkler logic 406 to control its operation (e.g., when to turn the sprinkler on and off).

Figure 5:
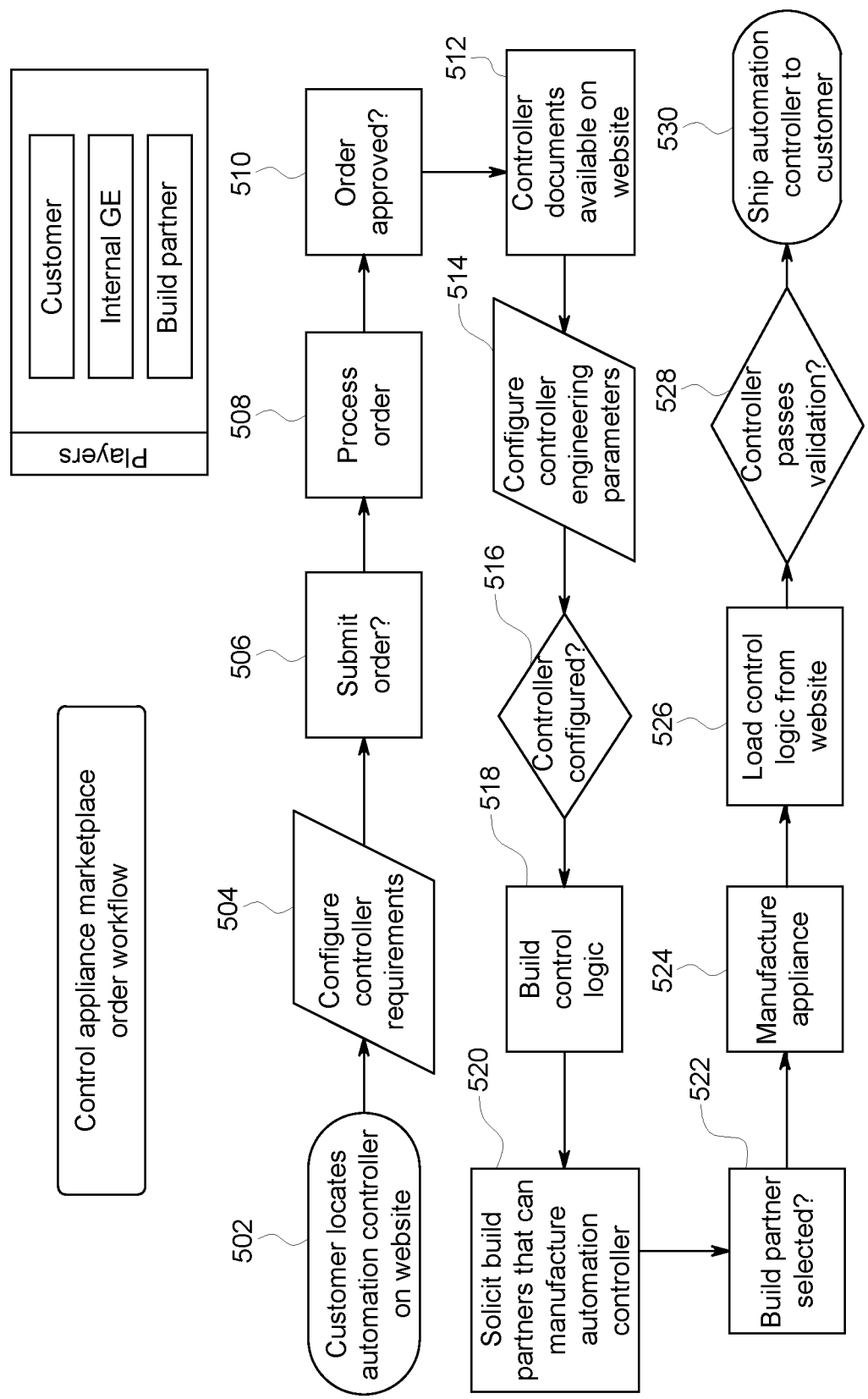
FIG. 5 comprises a flow chart showing one approach for ordering an automation controller according to various embodiments of the present invention.

Referring now to FIG. 5, one example of an approach for ordering and obtaining a complete physical automation controller (including its control logic) is described. At step 502, a customer views a website and determines an automation controller they desire to build. As described elsewhere herein, the customer may utilize a GUI display to indicate the structure and configuration of the automation controller. For example, the customer may select a pump controller as the type of automation controller they desire to purchase.

At step 504, the customer determines or configures particular controller requirements. For example, the customer may select certain operational requirements, cost parameters, or other parameters indicating the operational, cost, or other characteristics of the automation controller they desire to obtain. Together, the automation controller and parameter selection form an order.

At step 506, the order is submitted to the web site at a communication network. At step 508, the order is processed and at step 510, the order is approved at the website. The approval may come from the owner of the web site or some other third party and various constraints may be used to determine whether the order is to be approved.

At step 512, automation controller documents are made available at the website by the customer. These documents may be used to facilitate the building of a particular automation controller and its control logic. At step 514 engineering parameters are obtained from the customer. For example, physical operational characteristics of the controller are obtained.

At step 516 it is determined if the customer has adequately configured the automation controller and if they have, at step 518, the control logic for the automation controller is built at the communication network.

At step 520 build partners may be solicited to build the hardware for the automation controller. At step 522, a build partner is selected. Various types of criteria (e.g., cost or manufacturing speed) may be used to make the election. At step 524, the control logic for the automation controller is built. This is accomplished at the communication network and the control logic may be any combination of hardware and/or software.

At step 526, the control logic is loaded into the automation controller. At step 528, testing or validation is performed. In this respect, various tests may be automatically performed to ensure that the control logic is functioning properly. At step 530, the complete automation controller (hardware and control logic) is shipped to the customer. The customer can then install the automation controller at their site.

Figure 6:
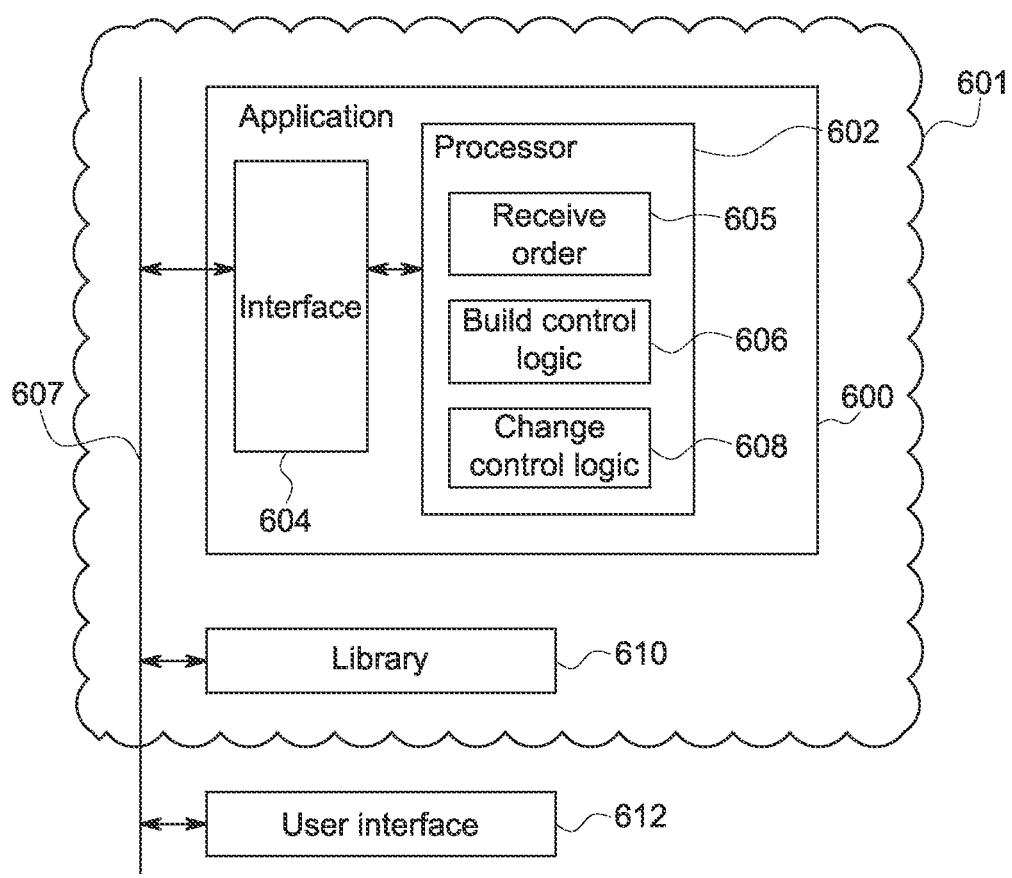
FIG. 6 comprises a block diagram of a communication network application that is used to build control logic according to various embodiments of the present invention.

Referring now to FIG. 6, one example of a communication network application 600 is described. Generally speaking, the functions of the communication network application 600 include the building and changing of control logic for automation controllers. The communication network application 600 resides at a communication network 601 and is remotely located from the automation controllers (i.e., it is separated physically from the automation controllers by a substantial distance).

The communication network application 600 includes a processor 602 and interface 604. The processor 602 includes a receive order module 605, a build control logic module 606, and a change control logic module 608. The interface 604 is coupled to communication medium 607. Communication medium 607 is coupled to a central repository 610 that includes central repository routines.

The communication medium 607 is also coupled to a user interface 612 where customers can enter orders. The communication medium 607 may be any medium such as wire, the air, a computer network, fiber optic cable, and so forth. Other examples of communication mediums are possible.

The receive order module 605 receives customer orders. In this respect, the medium includes software and/or hardware that receives and interprets customer orders. For example, it may receive the order and from the received order determine the identity of the customer and the type of automation controller the customer desires to obtain.

The build control logic module 606 builds the control logic. In this respect, the module 606 may include hardware and/or software that constructs the control logic (the control logic itself being hardware and/or software). In one example, the build control logic module 606 is programmed computer software that takes the customer order and automatically creates computer code that will be the control logic. This computer code implements the customer order and may utilize software library or central repository routines.

The change control logic module 608 changes the control logic representation according to a request made by the customer or another third party. The request indicates how the control logic is to be changed. In this respect, the module 608 may include hardware and/or software that receives a request to change the control logic along with information describing how this control logic is to be changed. In one example, the module 608 is programmed computer software that receives a change request and then changes the representation of the control logic that is stored in memory at the communication network.

The interface 604 provides formatting and control functions between the processor 602 and the communication medium 607. The processor 602 is any processing device such as a microprocessor or the like. The communication network application 600 may be disposed or implemented in any device such as an access point, server, or base station, to mention a few examples.

Figure 7:
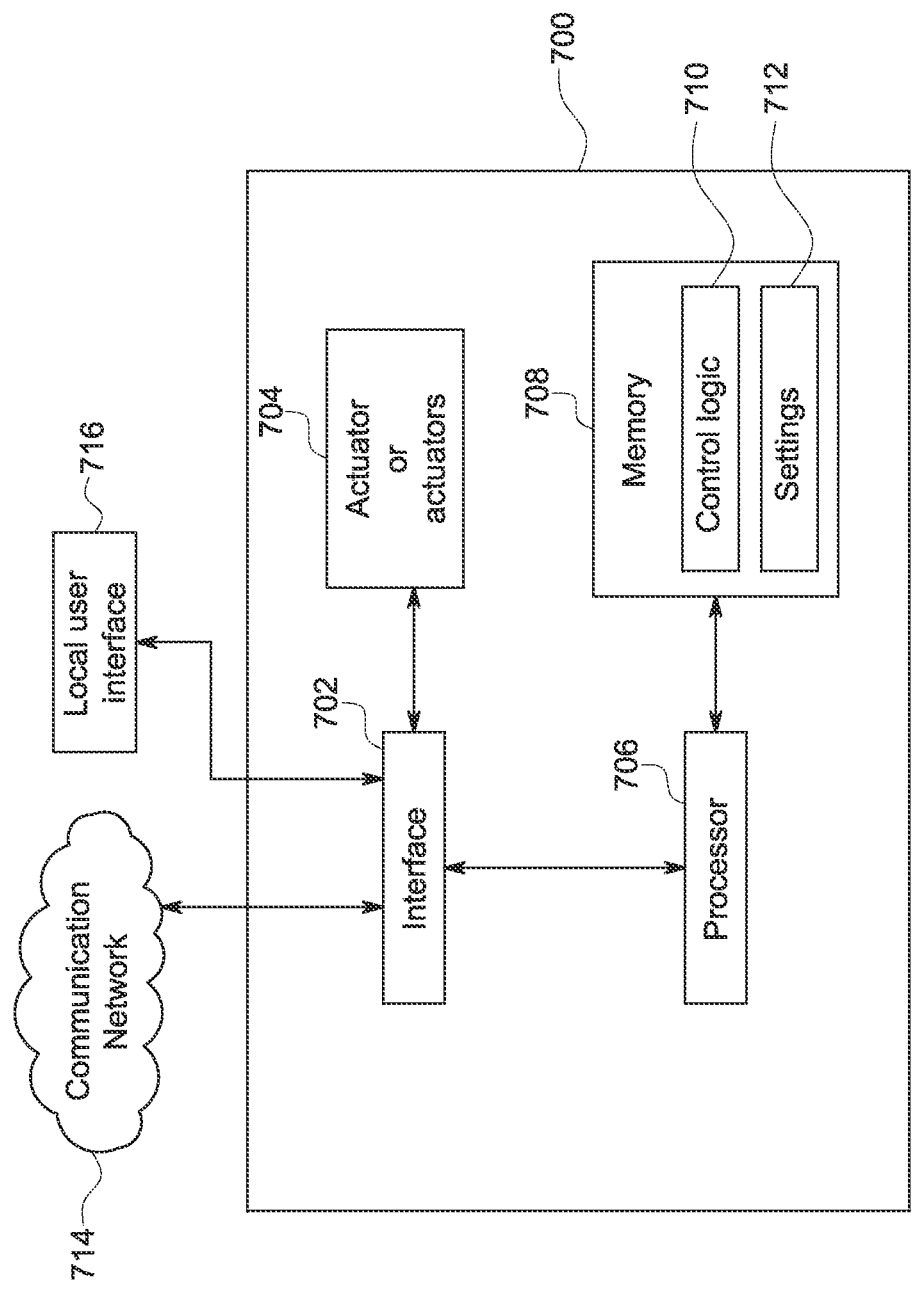
FIG. 7 comprises a block diagram of an automation controller according to various embodiments of the present invention.

Referring now to FIG. 7, one example of an automation controller 700 is described. The automation controller 700 includes an interface 702, one or more actuators 704, a processor 706, and a memory 708 (that includes control logic 710 and settings 712).

The interface 702 facilitates communications between the automation controller 700 and a communication network 714, and between the automation controller 700 and a local user interface 716. In this respect, the interface 702 includes hardware and/or software that interprets or translates commands and/or other information between the communication network 714 and the automation controller 700, and between the automation controller 700 and the local user interface 716.

The actuators 704 control, activate, or otherwise put into action physical or logical devices (e.g., the mechanical components of a valve or a sprinkler motor, to mention two examples). The function of the actuators 704 is to physically implement one or more of the functions associated with or provided by the controller 700.

The processor 706 is any programmed logic device such as a microprocessor or the like. Control logic 710 implements control functions that control actuators 704. Settings 712 are settings or other parameters (e.g., valve levels, pressures, temperatures, speeds) for the actuators 704.

Local user interface 716 may be a personal computer, cellular phone, or any other device that communicates with network 714 and/or controller 700. The communication network 714 is the location where the control logic 710 is built.

In one example of the operation of the system of FIG. 7, a customer constructs control logic 710 of the automation controller 700 by entering the requirements into the local user interface 716. These are sent to the communication network 714 via interface 702 (or, in another example, directly to the network 714). The control logic 710 is built at the network 714, downloaded to the automation controller 700, and stored in the memory 708. In this example, the control logic 710 is programmed software that is executed by the processor 706. Execution of the control logic 710 (that utilizes settings 712) causes the actuation of actuators 704. In one example, the control logic 710 is pump control logic and the actuators 704 are mechanical elements of a pump that are moved by execution of the control logic 710.

Figure 8:
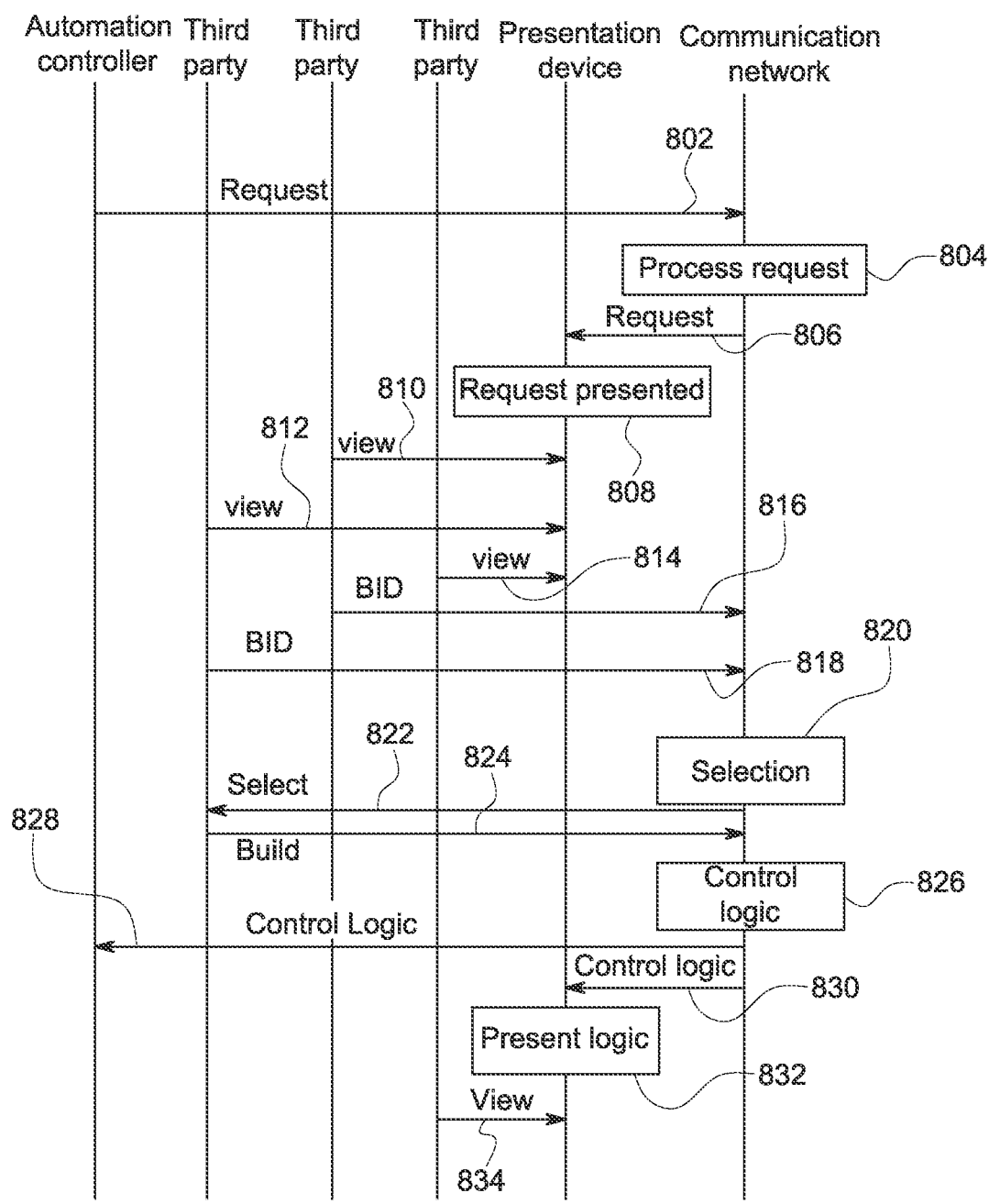
FIG. 8 comprises a diagram showing one approach for the provision of control logic according to various embodiments of the present invention.

Referring now to FIG. 8, one example of an approach for the provision of control logic and/or an automation controller is described. At step 802, a request is made by a user for control logic and/or an automation controller. The user may be a customer who may or may not own an automation controller. The request may specify the type, parameters, or other characteristics of the control logic. The request is processed at the communication network at step 804. At step 806, the request is sent to a presentation device (e.g., a web page or web site) and is presented to third party control logic providers at step 808.

Different third party providers view the request at steps 810, 812, and 814. At steps 816 and 818, two of the third party providers make bids for providing the control logic. At step 820, a selection as between the two different bids is made. Various criteria can be used to determine the selection.

At step 822, a select message is sent to the selected third party informing the selected third party of their selection and that the selected third party should proceed to build the control logic. At step 824, the third party proceeds to build the control logic 826 at the communication network, for instance, using the approaches that have been described elsewhere herein. At step 828, the control logic may be downloaded to the automation controller. At step 830, the control logic may be downloaded to a presentation device and at step 832 presented to third party. At step 834, a third party may view the control logic (or attributes of the control logic) at the presentation device. Further, in some situations the presented control logic can be purchased by third parties.

Referring now to FIGS. 9-18, examples of a web site at a communication network where a user can view different view the workings of control logic, build control logic, shop for control logic, and view the operation of control logic is described. It will be appreciated that this is one example of a web site and that other examples are possible.

The web site is entered by, for example, logging into the website. Alternatively, no login is required. In any case, the first screen encountered is a login screen 900. The login screen includes fields 902, 904, 906, 908 and 910. The field 902 is a field for Aqualung, Inc. The second field 904 is for the Calgary water treatment plant. Fields 906 and 908 are local community fields. Field 910 allows the user to browse different communities.

Figure 9:
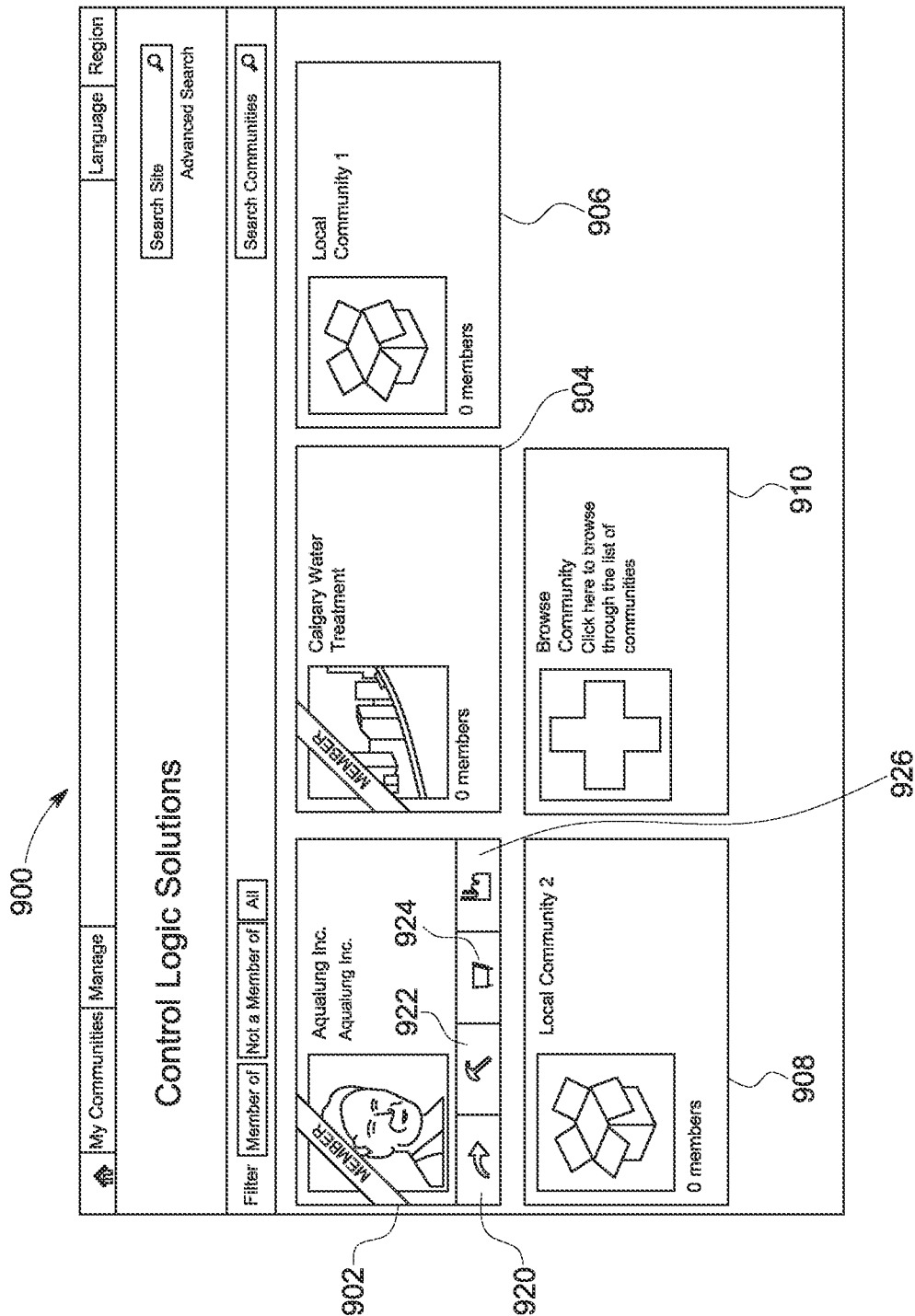
FIGS. 9-18 are screen shots of aspects of a web site that is used to build, view, and/or purchase control logic according to various embodiments of the present invention.

As shown in FIG. 9, the fields represent various communities or groups of users related by a common interest. The communities may be public or private. For example, the fields may represent groups of friends, different companies, different organizations within a companies, or different schools to mention a few examples.

Hovering a computer mouse over a field 902, 904, 906, or 908 causes a group of selectable icons 920, 922, 924, and the icon 926 associated with the field to appear. It will be appreciated that in the description that follows, it is assumed icons related to the field 902 are selected. However, it will be understood that the other fields 904, 906, and 908 operate in a similar way (and have the same icons when a computer mouse hovers over them) and this operation will not be described here.

The icon 920 can be selected to view aspects of the control logic. The icon 922 is selected to allow a user to build control logic. The icon 924 is selected to allow the user to shop for control logic. The icon 926 is selected to allow the user to see operational details of the control logic.

Figure 10:
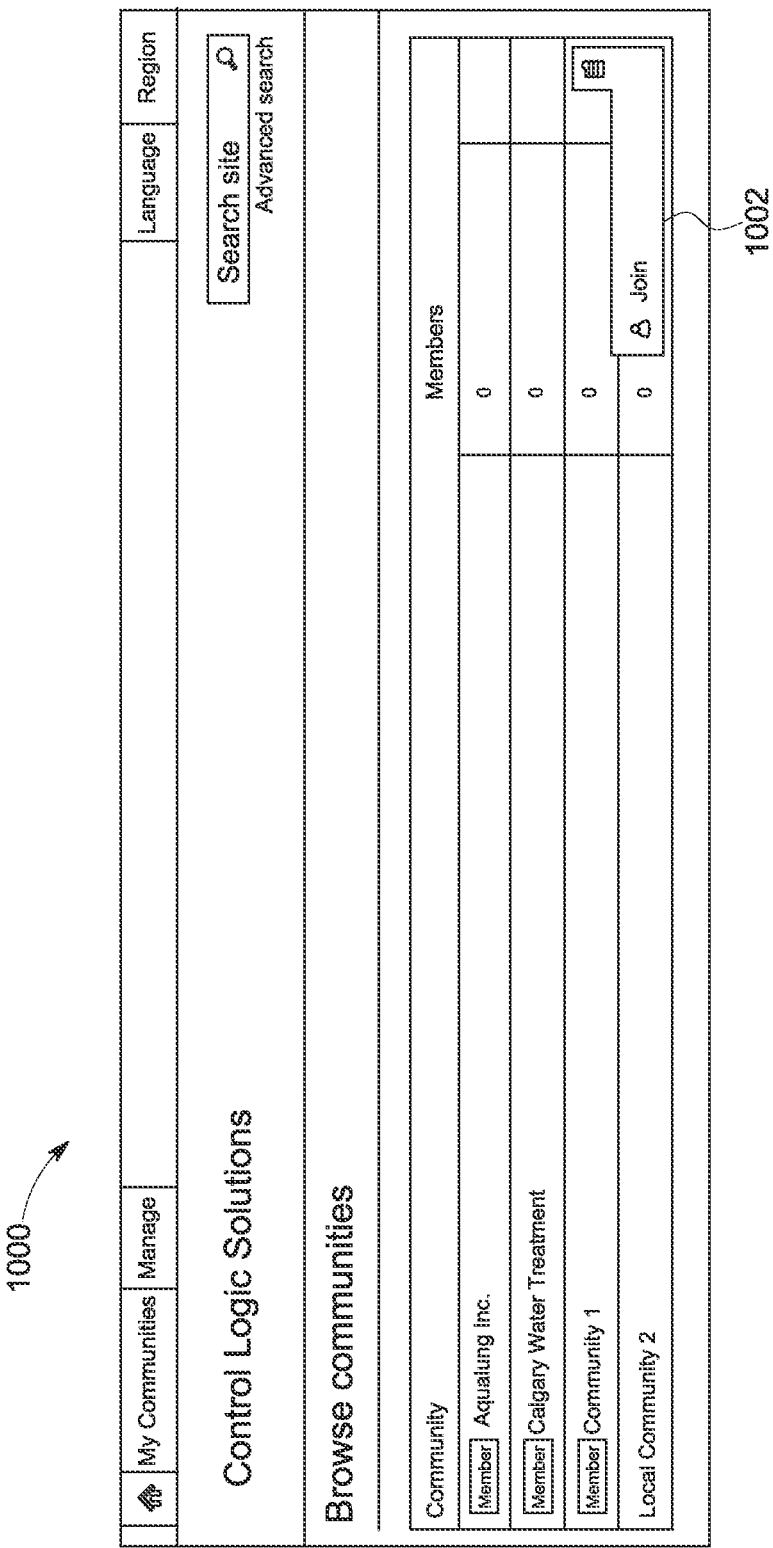

Referring now to FIG. 10, selection of the field 910 causes a browse communities screen 1000 to appear. The browse communities screen 1000 shows communities where the user is a member (in this example, Aqualung, Calgary Water Treatment, and Community 1). An icon 1002 can be selected to allow a user to join another community (Community 2). Some or all of the communities may allow users to join by invitation only.

Figure 11:
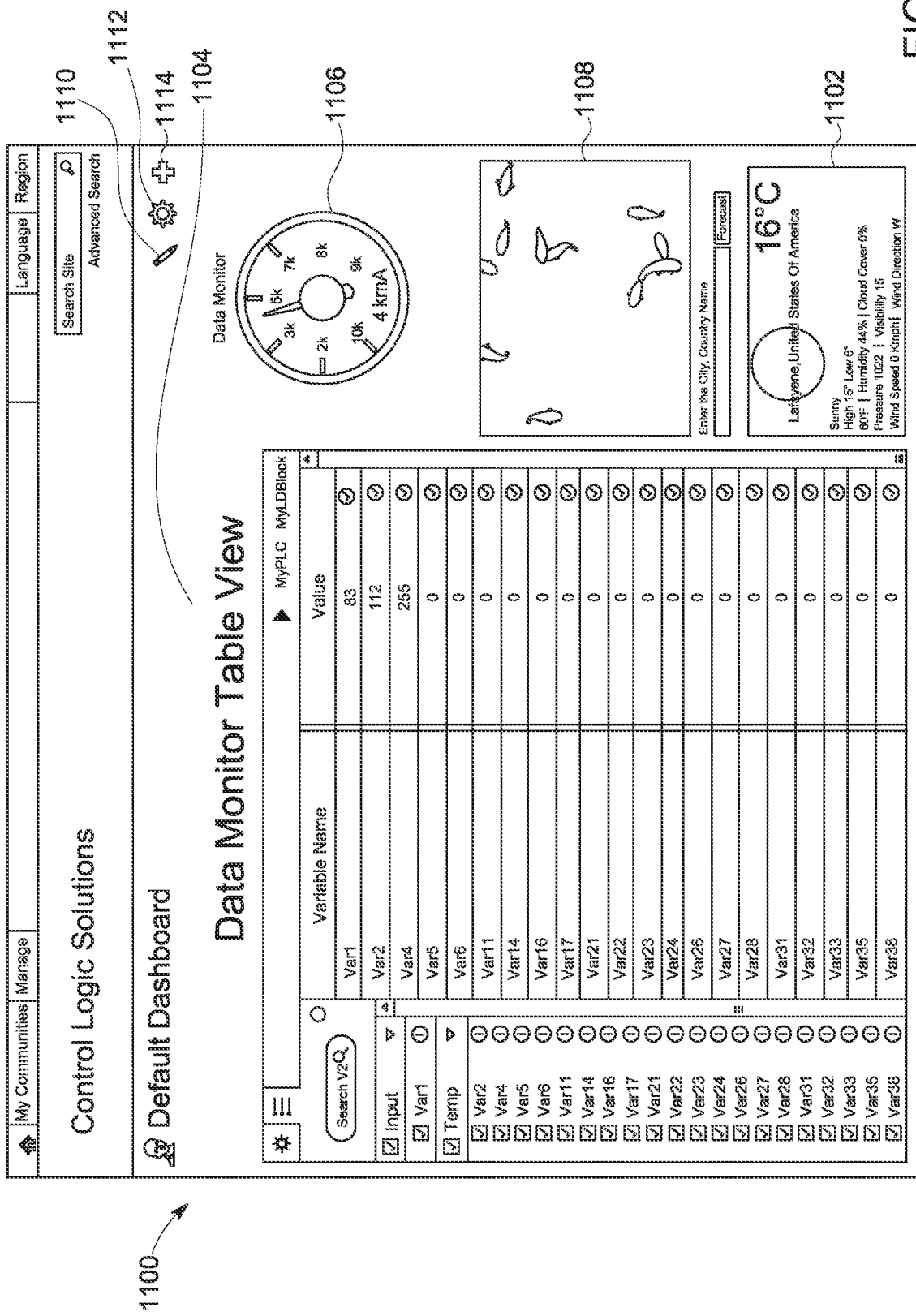

Referring now to FIG. 11, one example of a screen 1100 that is displayed when the icon 920 is selected is described. This is a user customizable screen that can represent different components of a control solution. This screen has display areas 1102, 1104, 1106, and 1108. The area 1102 displays weather information. The area 1104 displays parameters for control logic. The area 1106 is a live real-time display of one of the parameters. The area 1108 displays an image of the system where the controller is being used (in this case a fish tank). A pencil icon 1110 may be selected to resize the relative sizes of display areas 1102, 1104, 1106, and 1108. A gear icon 1112 may be selected alter the overall size of the entire display 1100. A plus icon 1114 may be used to add display areas to screen 1000 or elements to the areas (referred to in the drawings as widgets).

Figure 12:
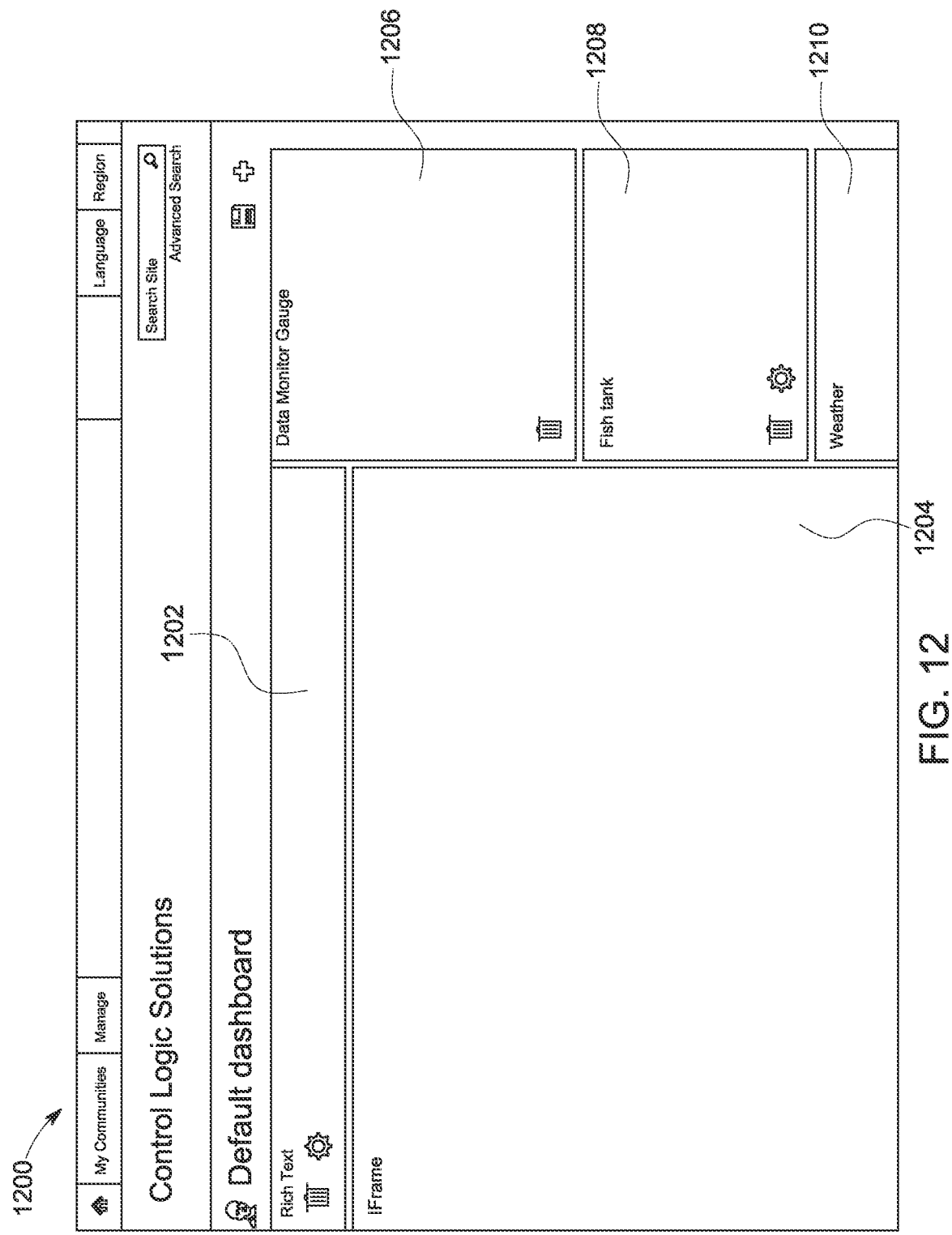

Referring now to FIG. 12, one example of a display 1200 where the various areas 1202, 1204, 1206, 1208, and 1210 can be resized is described. This display is shown after the pencil icon 1110 is selected. By dragging and dropping edges of the areas 1202, 1204, 1206, or 1208 using a computer mouse, the relative sizing of these areas can be changed.

Figure 13:

Referring now to FIG. 13, one example of a display 1300 presented when the plus icon 1114 is selected is described. The display 1300 includes a first field 1302 where a user can add new areas to the displays 1100 and 1200. A second field 1304 is used to add widgets (e.g., fish to the fish tank).

Figure 14:
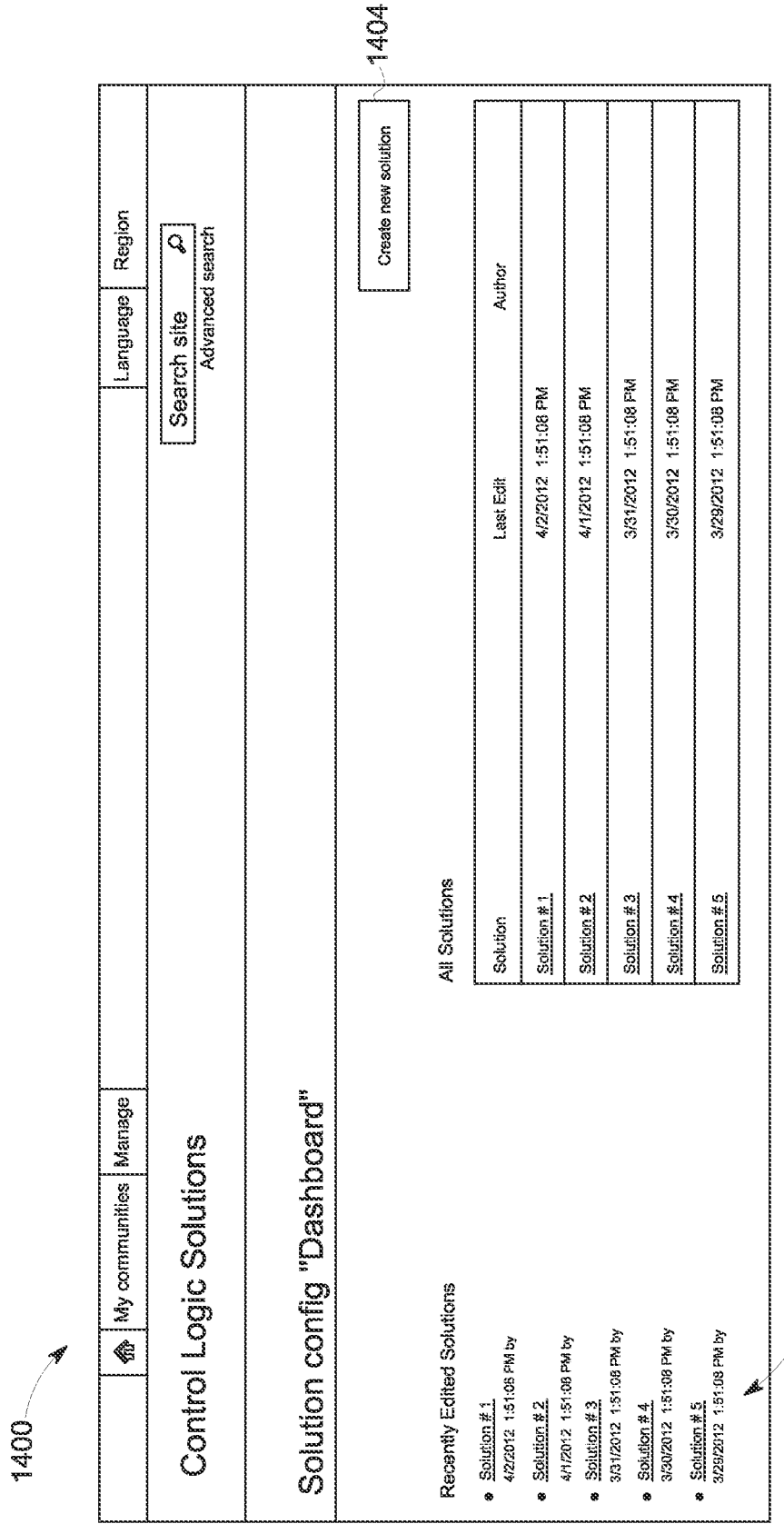

Referring now to FIG. 14, one example of a display 1400 that is presented when the build icon 922 of FIG. 9 is selected is described. The screen 1400 displays solutions 1402 (i.e., control logic) that has been created or recently edited. An icon 1404 is selected when new control logic is to be built.

Figure 15:
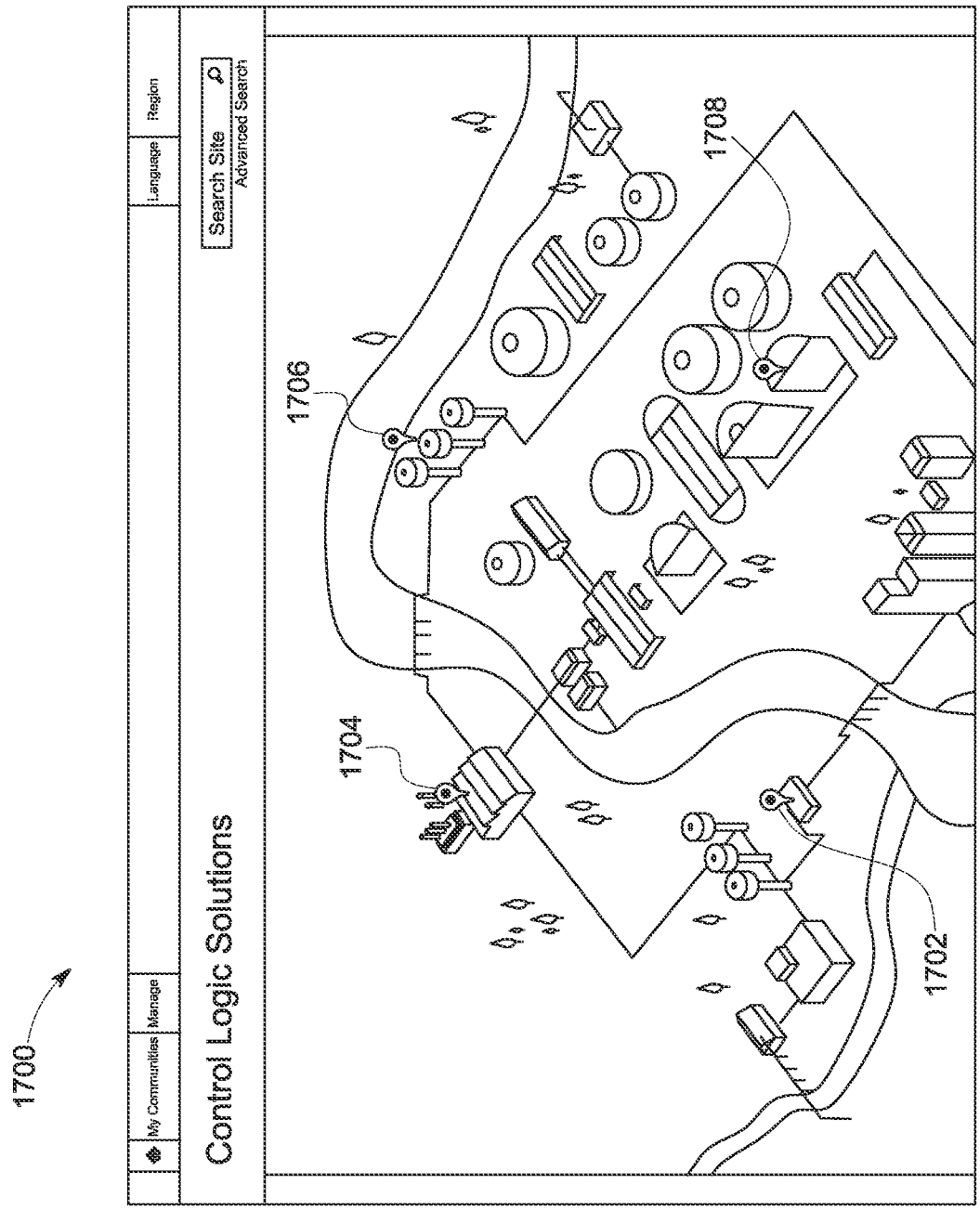

Referring now to FIG. 15, one example of a screen 1700 that is displayed when the shopping icon 924 of FIG. 9 is selected is described. This screen displays an area of interest to the user (e.g., a factory, local geographic area, office building). Pins 1702, 1704, 1706, and 1708 (that are selectable icons) represent automation controllers (and their control logic) within the area. It will be appreciated that a larger geographic map (e.g., world wide map) can first be displayed and successive selections of areas within the map may be used to narrow the area of interest (e.g., to show the area shown in display area 1700).

Figure 16:

FIG. 16 illustrates how selection of one of the pins 1702, 1704, 1706, and 1708 results in a screen 1800 as shown in FIG. 16 being displayed. This screen 1800 presents options 1802, 1804, and 1806 (that include selectable icons) for the user to purchase control logic that may be placed on the automation controller represented by the pins 1702, 1704, 1706, or 1708. The user selects one of these options to pay for the control logic.

Figure 17:
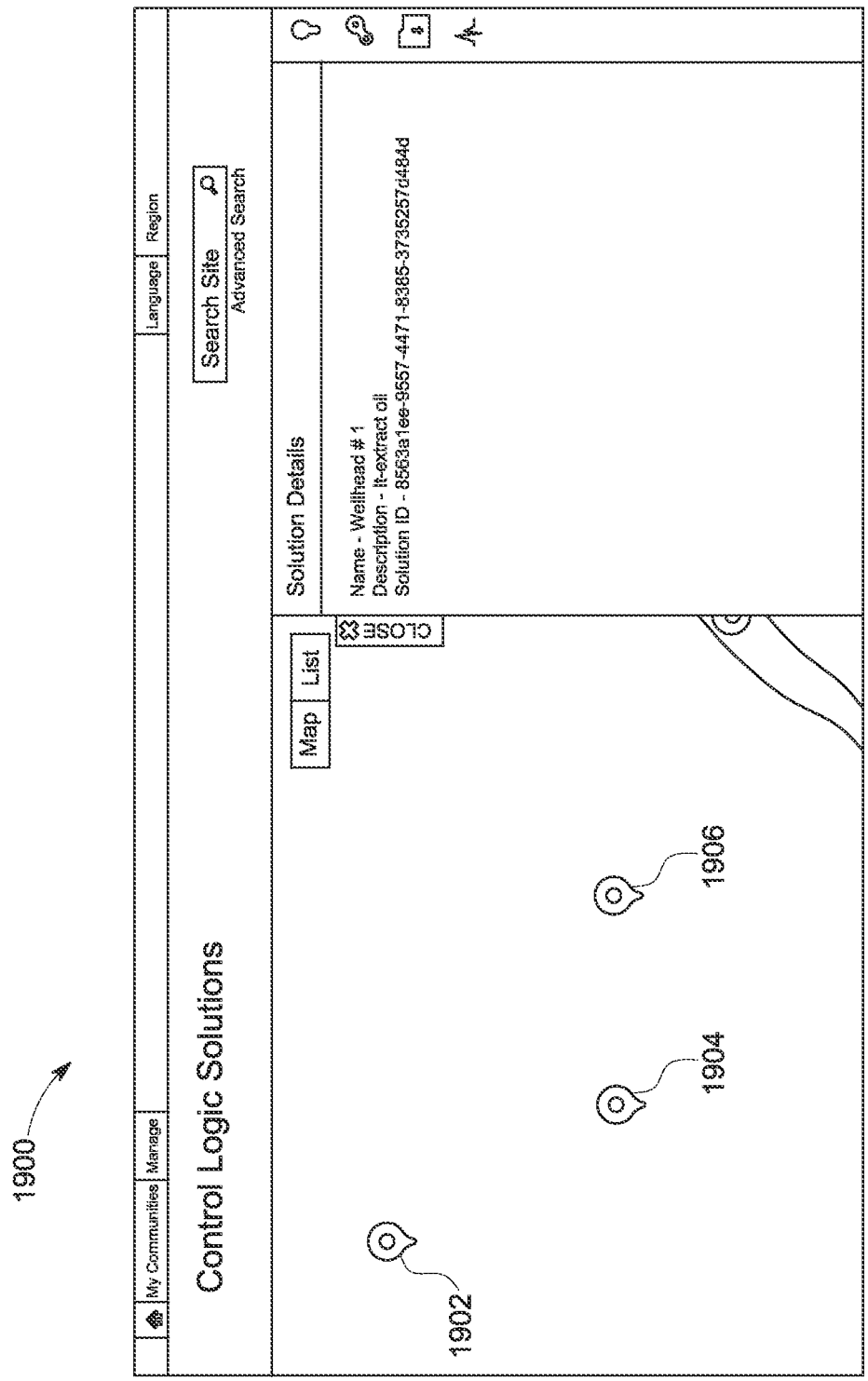

Referring now to FIG. 17, one example of a display 1900 presented when the icon 926 is selected to view operational details of the control logic. This option allows viewing of the operational details, a hardware summary, downloads, and monitoring of an automation controller (and its control logic) as being used at a customer site. The screen has pins 1902, 1904, and 1906 (that are selectable icons) representing operational automation controllers. It will be appreciated that a larger geographic map (e.g., world wide map) can first be displayed and successive selections of areas within the map may be used to narrow the area of interest (e.g., to show the area shown in display area 1900).

Figure 18:
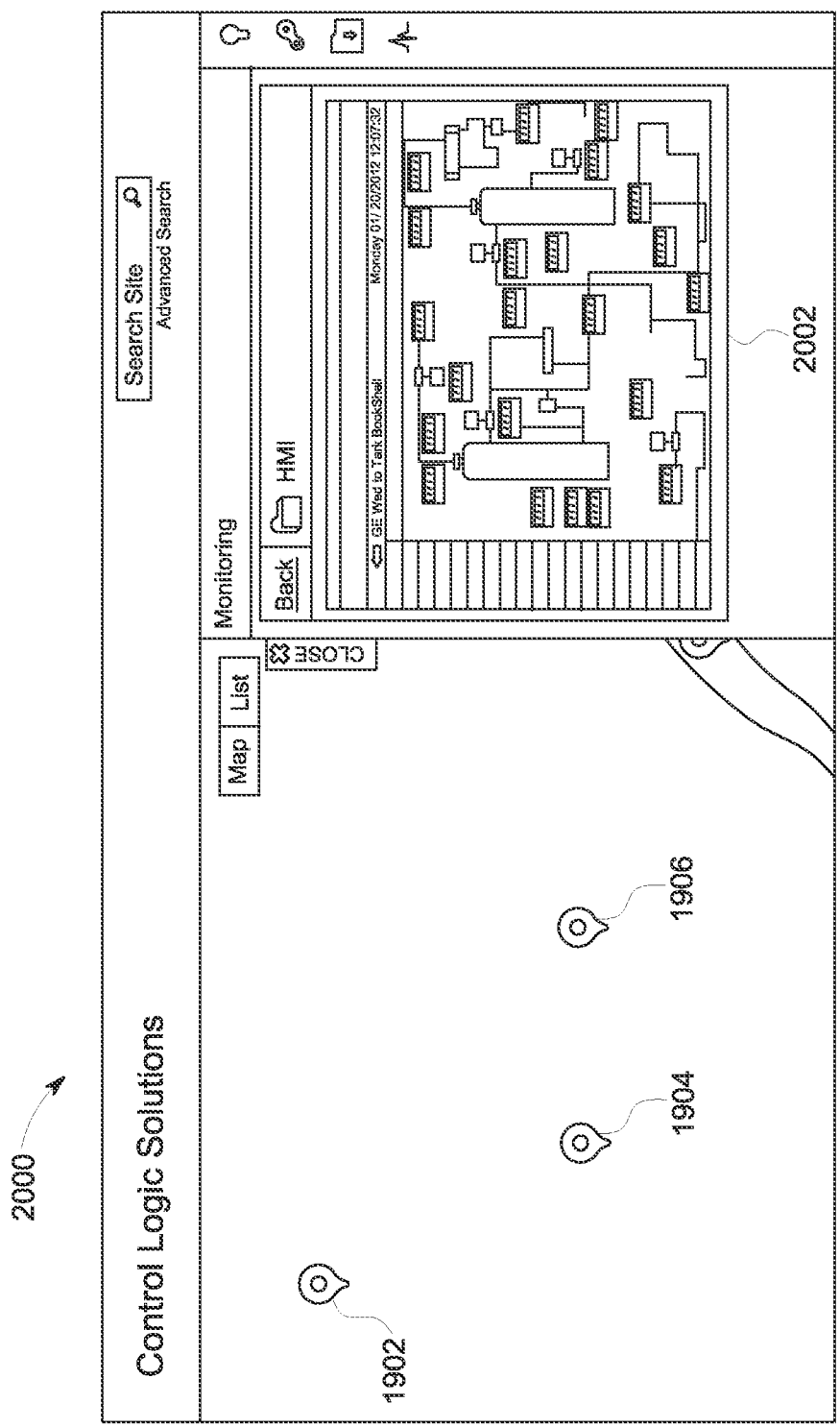

Selection of one of the icons 1902, 1904, or 1906 causes the presentation of a screen 2000 (now referring to FIG. 18). FIG. 18 also includes an area 2002 that shows the automation controller as well as its surrounding environment at the customer site. From the screen 2000 and from the area 2002, the operational details, hardware summary, downloads, and monitoring of an automation controller can be obtained by selecting appropriate icons.

As mentioned, it will be appreciated that the specific website and web pages presented in FIGS. 9-18 are only one example of a user interface that can be utilized by customers to build, select, purchase, or view aspects of operating control logic. Other examples are possible. In addition, other selection approaches besides using a computer mouse to hover over and select icons by clicking on the icons may also be used.

Preferred embodiments of this invention are described herein, including the best mode known to the inventors for carrying out the invention. It should be understood that the illustrated embodiments are exemplary only, and should not be taken as limiting the scope of the invention.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A method of providing a platform for procuring control logic for automation controllers to be performed at a communication network, the method comprising:

obtaining, via a network-based website, customer order parameters for a first control logic for an automation controller, the automation controller being physically located at a customer location;

building, via the communication network, the first control logic that conforms to the customer order parameters;

transmitting, from the communication network via the network-based website, the first control logic to the automation controller;

storing the first control logic at the communication network;

receiving, via the network-based website, change requests to the first control logic from a user;

in response to the change requests, if the user desires to custom design their own routines, sending a custom design command indicating the routines to a first module, wherein the first module create custom design routines, otherwise sending the change request to a second module, wherein the second module maps via a mapping module the user change requests to particular routines in a central repository;

generating, at the communication network, a second control logic based on the stored first control logic and the operation of the first module or second module, wherein the receiving and generating occur independent of the involvement or intervention of a third party vendor;

modifying a control logic representation of the second control logic in a memory of the communication network without halting the operation of the automation controller;

transmitting, from the communication network via the network-based website, the modified control logic representation of the second control logic to the automation controller; and operating the automation controller using the second control logic;

wherein the customer order parameters include at least one of:

interface connections of the automation controller, interface configurations of the automation controller, and operating characteristics of the automation controller.

2. The method of claim 1, wherein the customer order is received via a graphical user interface.

3. The method of claim 1, wherein the customer order describes a plurality of control elements and interaction of selected ones of the plurality of control elements.

4. The method of claim 1, wherein the automation controller is selected from the group consisting of a robot controller and an assembly line controller.

5. The method of claim 1, wherein the automation controller is selected from the group consisting of an emulated controller and a physical controller.

6. The method of claim 1, wherein the first and second control logic utilizes central repository routines.

7. The method of claim 1, wherein the customer order parameters further include operational parameters and cost parameters.

8. The method of claim 1, wherein the customer order parameters further include hardware automation engineering parameters, and wherein the method further comprises generating a build order for a hardware automation controller.

9. The method of claim 8 further comprising verifying the first control logic on the hardware automation controller.

10. The method of claim 8 further comprising verifying the second control logic on the hardware automation controller.

11. The method of claim 1 further comprising determining if the user has adequately configured the automation controller based, at least in part on, the customer order parameters.

12. An apparatus for building and changing control logic, the apparatus residing at a communication network remote from a customer location, the apparatus comprising:
    an interface having an input and output, the input receiving, via a network-based website, customer order parameters for a first control logic for an automation controller existing at the customer location; and
    a processor coupled to a memory and the interface, the processor configured to:
        build the first control logic that conforms to the customer order parameters;
        transmit, from the communication network via the network-based website, the first control logic to the automation controller;
        store the first control logic at the memory;
        receive changes to the first control logic at the input of the interface;
        in response to receiving the changes, if a user desires to custom design their own routines, send a custom design command indicating the routines to a first module, wherein the first module create custom design routines, otherwise send the changes to a second module, wherein the second module maps via a mapping module the changes to particular routines in a central repository;
        generate a second control logic based on the stored first control logic and the operation of the first module or second module, wherein the receiving and generating occur independent of the involvement or intervention of a third party vendor;
        modify a control logic representation of the second control logic in a memory of the communication network without halting the operation of the automation controller;
        transmit, from the communication network via the network-based website, the modified control logic representation of the second control logic to the automation controller; and
        operate the automation controller using the second control logic;
    wherein the customer order parameters induce at least one of: interface connections of the automation controller, interface configurations of the automation controller, and
    operating characteristics of the automation controller.

13. The apparatus of claim 12, wherein the customer order is received via a graphical user interface.

14. The apparatus of claim 12, wherein the customer order describes a plurality of control elements and interaction of selected ones of the plurality of control elements.

15. The apparatus of claim 12, wherein the automation controller is selected from the group consisting of: a robot controller, an assembly line controller, and a consumer device controller.

16. The apparatus of claim 12 wherein the automation controller is selected from the group consisting: of an emulated controller and a physical controller.

17. The apparatus of claim 12, wherein the first and second control logic utilizes central repository routines.

* * * * *